United States Patent [19]

Streusand

[11] Patent Number: 4,588,768
[45] Date of Patent: May 13, 1986

[54] THERMALLY CONDUCTIVE HEAT CURABLE ORGANOPOLYSILOXANE COMPOSITIONS

[75] Inventor: Marie J. Streusand, Saline, Mich.

[73] Assignee: SWS Silicones Corporation, Adrian, Mich.

[21] Appl. No.: 665,576

[22] Filed: Oct. 29, 1984

[51] Int. Cl.$^4$ .............................................. C08K 3/34
[52] U.S. Cl. .................................... 524/443; 524/588
[58] Field of Search .................... 524/443, 588, 789

[56] References Cited

U.S. PATENT DOCUMENTS

| | | | |
|---|---|---|---|
| 3,070,559 | 12/1962 | Nitzsche et al. | 524/588 |
| 3,499,856 | 3/1970 | Funatsu et al. | 524/238 |
| 3,499,859 | 3/1970 | Matherly | 524/701 |
| 3,642,692 | 2/1972 | Hartlage | 524/588 |
| 3,836,489 | 9/1974 | Bargain | 524/588 |
| 4,024,933 | 5/1977 | Hinderks | 188/77 R |
| 4,123,472 | 10/1978 | Getson et al. | 525/451 |
| 4,292,225 | 9/1981 | Theodore et al. | 524/188 |
| 4,419,650 | 12/1983 | John | 423/445 |

FOREIGN PATENT DOCUMENTS

| | | | |
|---|---|---|---|
| 55-71677 | 5/1980 | Japan | 524/443 |
| 56-161461 | 12/1981 | Japan | 524/789 |

*Primary Examiner*—Lewis T. Jacobs

[57] ABSTRACT

This invention relates to thermally conductive heat curable organopolysiloxane compositions containing from 30 to 95 percent by weight of filler based on the weight of the composition of which at least 10 percent by weight of the filler is silicon nitride particles.

9 Claims, No Drawings

THERMALLY CONDUCTIVE HEAT CURABLE ORGANOPOLYSILOXANE COMPOSITIONS

The present invention relates to silicone elastomers having thermal conductive properties and more particularly to heat curable organopolysiloxane compositions containing thermally conductive particles.

BACKGROUND OF THE INVENTION

Various materials have been incorporated in organopolysiloxane compositions to improve the thermal conductivity of the resultant elastomers. For example, U.S. Pat. No. 3,499,859 to Matherly discloses adding boron nitride particles to room temperature vulcanizable organopolysiloxane compositions to form thermally conductive silicone elastomers. Also, U.S. Pat. No. 4,292,225 to Theodore et al, describes highly filled organopolysiloxane compositions containing boron refractory powders having good thermal conductive properties.

In contrast to the teachings of U.S. Pat. Nos. 3,499,859 and 4,292,225, it has been found that organopolysiloxane compositions having increased filler loadings provide elastomers having desirable physical properties as well as excellent thermal conductivity. Moreover, the compositions of this invention are useful for insulating electrical components because they permit any heat which is generated to be conducted away from the electrical component. Furthermore, the compositions of this invention are unique in that filler loadings in excess of 60 percent by weight based on the weight of the composition can be achieved using silicon nitride particles and the resultant elastomers have superior thermal conductivity and desirable physical properties.

It is, therefore, an object of this invention to provide a highly filled thermally conductive vulcanizable organopolysiloxane composition containing silicon nitride particles. Another object of this invention is to provide a thermally conductive composition having unique physical properties by virtue of the use of silicon nitride particles in filler loadings in excess of 60 percent by weight based on the weight of the composition. Still another object of this composition is to provide a highly filled composition which is sufficiently pliable that it can be extruded and cured. A further object of this invention is to provide highly filled heat curable compositions having improved thermal conductivity.

SUMMARY OF THE INVENTION

The foregoing objects and others which will become apparent from the following descriptions are accomplished in accordance with this invention, generally speaking, by providing heat curable compositions containing an organopolysiloxane capable of being cured at an elevated temperature, a vulcanizing agent and from 30 to 95 percent by weight of filler based on the weight of the composition, of which at least 10 percent by weight of filler is silicon nitride particles. The resultant composition is heated to an elevated temperature to form a thermally conductive elastomer.

DESCRIPTION OF THE INVENTION

The organopolysiloxanes employed in the compositions of this invention generally have recurring structural units of the general formula

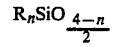

where R is selected from the group consisting of monovalent hydrocarbon radicals and substituted monovalent hydrocarbon radicals having from 1 to 18 carbon atoms and n is an integer of from about 1.7 to 2.2, with an average value of from about 1.8 to 2.1.

It is preferred that the hydrocarbon radicals and substituted hydrocarbon radicals represented by R each contain from 1 to 18 carbon atoms. Examples of suitable hydrocarbon radicals are alkyl radicals, such as the methyl, ethyl, n-propyl and isopropyl radicals, as well as octadecyl radicals; cycloalkyl radicals such as the cyclohexyl and the cycloheptyl radicals; aryl radicals such as the phenyl radical; alkaryl radicals such as the tolyl radicals and aralkyl radicals such as the benzyl and beta-phenylethyl radicals. Examples of substituted hydrocarbon radicals reprsented by R are halogenated hydrocarbon radicals, such as the 3,3,3-trifluoropropyl radical and o-, p- and m-chlorophenyl radicals. Because of their availability, it is preferred that at least 80 percent of the R radicals be methyl radicals.

The viscosity of the organopolysiloxanes employed in the compositions of this invention may range from about 300 mPa.s at 25° C. up to a gum having a Williams plasticity number up to about 250. More preferably, the organopolysiloxanes have a viscosity of from about 1000 mPa.s at 25° C. up to a plasticity number of about 200. These organopolysiloxanes are essentially linear polymers containing diorganosiloxane units of the formula $R_2SiO$; however, they may also contain minor amounts, generally not more than about 2 mol percent of other units, such as $RSiO_{3/2}$ units, $R_3SiO_{0.5}$ and/or $SiO_{4/2}$ units, in which R is the same as above. Included specifically in the above formula are the dimethylpolysiloxanes, methylphenylpolysiloxanes, methylvinylpolysiloxanes, and copolymers of such units, such as copolymers containing dimethyl- and phenylmethylsiloxane units and copolymers containing phenylmethyl-, dimethyl- and vinylmethylsiloxane units. These organopolysiloxanes are well known in the art and methods for producing such materials are old and widely described in the literature.

Vulcanizing agents which may be added to the organopolysiloxane compositions to effect rapid conversion of the compositions to an elastomer are organic peroxides, such as benzoyl peroxide, t-butyl perbenzoate, bis-(2,4-dichlorobenzoyl)peroxide, dicumyl peroxide, dialkyl peroxides, such as di-t-butyl peroxide, p-chlorobenzoyl peroxide, etc. These vulcanizing agents may be present in amounts ranging from about 0.1 to as high as 4 to 8 percent by weight or even more based on the weight of the organopolysiloxane polymers.

The silicon nitride particles employed in the compositions of this invention are polycrystalline or amorphous materials having an average particle size of from about 0.5 to about 350 microns and more preferably from about 40 to 250 microns. The particle size is not critical as long as the particles are not so large as to be difficult to mix with the organopolysiloxane to form a homogeneous mixture.

The silicon nitride particles may be used with other fillers such as reinforcing fillers, i.e., fillers having a surface area of at least 50 m²/gm. Examples of such fillers are precipitated silicon dioxide having a surface area of at least 50 m$^2$/gm and/or pyrogenically produced silicon dioxide. Examples of other reinforcing fillers are the aerogels, alumina, carbon blacks and graphite.

A portion of the fillers can be semi- or non-reinforcing fillers, i.e., fillers which have a surface area of less than 50 m$^2$/gm. Examples of semi- or non-reinforcing fillers are metal oxides, metal nitrides, glass beads, bubbles or fibers, metallic flakes, powders, and fibers such as copper, nickel and aluminum, cork, organic resins, polytetrafluoroethylene, polychlorotrifluoroethylene, polyvinyl chloride, bentonite, diatomaceous earth, crushed quartz, mica, and mixtures thereof. Preferred examples of metal oxide fillers are zinc oxide, ferric oxide, alumina and titanium oxide. The fillers may also be treated with, for example, triorganoalkoxysilanes, such as trimethylethoxysilane to coat the surfaces with organosiloxy groups.

The amount of fillers including silicon nitride particles which may be incorporated in the compositions of this invention is not critical and may vary over a wide range. Thus, the amount of filler including silicon nitride particles may range from about 30 to 95 percent by weight and more preferably from about 40 to 90 percent by weight, based on the weight of the composition, in which at least 10 percent by weight of the filler is silicon nitride particles. More preferably, the amount of silicon nitride particles may range from about 30 to 100 percent by weight based on the weight of the filler. It is, however, preferred that the other fillers employed in the composition not interfere with the thermal conductivity of the resultant composition.

Other additives which can be incorporated into the compositions of this invention include pigments, compression set additives, oxidation inhibitors, adhesion promoters, and other materials commonly employed as additives in the silicone rubber art. Such additives are preferably present in an amount below about 15 percent by weight based on the weight of the composition.

Various antistructuring agents may also be incorporated in the compositions of this invention to prevent hardening or "crepe aging" of the materials prior to vulcanization. Examples of suitable antistructuring agents are water; hydroxyl-terminated silanes and siloxanes having a viscosity of from about 30 to 100 centistokes, such as diphenylsilane diols, methylphenylsilane diols, hydroxylated methylpolysiloxanes, hydroxylated methylphenylpolysiloxanes, hydroxylated diphenylpolysiloxanes; methyl endblocked dimethylpolysiloxane fluids, low molecular weight alkoxylated siloxanes; phosphate fluids, such as tripropylphosphate and tributylphosphate; glycols, such as methylene glycol and propylene glycol; esters; and anhydrides, such as phthalic anhydride.

The amount of antistructuring agents employed in these compositions generally ranges from about 2 to 30 percent, preferably from about 5 to 20 percent by weight based on the weight of the organopolysiloxane polymers.

The manner in which the present invention may be practiced may be widely varied. The silicon nitride particles may be incorporated in the curable organopolysiloxane compositions before the addition of the reinforcing and/or non-reinforcing fillers or it may be incorporated simultaneously with the other fillers. Vulcanizing agents and other additives, such as dyes, pigments, and flame retardants, may be added to the organopolysiloxane compositions during the milling operation. Alternatively, the silicon nitride particles may be added to the organopolysiloxane compositions and then milled with the reinforcing and non-reinforcing fillers at some future time.

The organopolysiloxane compositions of this invention may be molded or extruded and cured in accordance with the conventional techniques known in the art. They may, for example, be cured at temperatures ranging from about 100° to 200° C. or more for varying periods of time ranging from less than 1 minute up to several hours.

The compositions of this invention can be used for any electrical insulation where it is desirable to conduct the heat away from the source. The compositions of this invention are especially useful for encapsulating semiconductors since they both insulate and conduct the heat away from the semiconductor. These compositions may also be injection molded to form thermally conductive pads for use in various electrical applications.

The embodiments of this invention are further illustrated in the following examples in which all parts and percentages are by weight unless otherwise specified.

EXAMPLE 1

A heat curable organopolysiloxane composition is prepared by mixing 5 parts of a vinyl-terminated dimethylpolysiloxane having a viscosity of about 18000 mPa.s at 25° C. and having a vinyl content of about 0.075 weight percent with 5 parts of a vinyl-terminated dimethylpolysiloxane having a viscosity of about 132,000 mPa.s at 25° C. and a vinyl content of about 0.58 weight percent, 0.4 parts of a methylvinyldimethylpolysiloxane diol having a viscosity of about 40 mPa.s at 25° C. and containing about 3.5 weight percent OH and having a vinyl content of about 2 weight percent, 45.5 parts silicon nitride particles (325 mesh) and 0.1 part of synthetic amorphous calcium silicate. The resultant composition is then mixed with 8.4 parts of a trimethylsiloxy-terminated dimethylpolysiloxane having a viscosity of 60,000 mPa.s at 25° C. and 1.4 parts dicumyl peroxide to form a homogenous composition. The resultant composition is molded and cured for 30 minutes at 175° C. The physical properties and thermal conductivity are shown in the following table.

EXAMPLE 2

The procedure of Example 1 is repeated, except that the trimethylsiloxy-terminated dimethylpolysiloxane is omitted and 0.056 parts of dicumyl peroxide is substituted for 1.4 parts of dicumyl peroxide. The physical properties and the thermal conductivity are shown in the following table.

TABLE

| Physical Properties | Example 1 | Example 2 |
|---|---|---|
| Tensile strength, psi. | 331 | 587 |
| Elongation, percent | 129 | 84 |
| Durometer, Shore A | 50 | 91 |
| Tear strength, lb./in. | 38 | 68 |
| Thermal conductivity, cal. cm.$^{-1}$ sec.$^{-1}$ °C.$^{-1}$ | $7.8 \times 10^{-4}$ | $1 \times 10^{-3}$ |

EXAMPLE 3

The procedure of Example 1 is repeated except that 10 parts of silicon nitride particles and 50 parts of fumed silica are substituted for the 45.5 parts of silicon nitride particles. The resultant elastomer exhibits good physical properties and thermal conductivity.

EXAMPLE 4

The procedure of Example 1 is repeated except that 40 parts of silicon nitride particles and 5.5 parts of nickel flakes are substituted for the 45.5 parts of silicon nitride particles. The resultant elastomer exhibits good physical and thermal conductivity.

What is claimed is:

1. A thermally conductive heat curable organopolysiloxane composition comprising an organopolysiloxane having recurring units of the formula $$R_nSiO_{\frac{4-n}{2}}$$

where R is selected from the group consisting of monovalent hydrocarbon radicals and halogenated monovalent hydrocarbon radicals having from 1 to 18 carbon atoms and n is a number of from 1.7 to 2.2, an organic peroxide vulcanizing agent and from 30 to 95 percent by weight of filler based on the weight of the composition, of which from about 30 to 100 percent by weight based on the weight of the filler is silicon nitride particles.

2. The composition of claim 1, wherein the silicon nitride particles range from 0.5 to 350 microns.

3. The composition of claim 1, wherein the silicon nitride particles range from 40 to 250 microns.

4. The composition of claim 1, wherein the organopolysiloxane is a copolymer of a dimethylsiloxane and a methylvinylsiloxane.

5. The composition of claim 1, wherein the organic peroxide is a dialkyl peroxide.

6. A method for preparing a thermally conductive silicone elastomer which comprises mixing an organopolysiloxane having recurring units of the formula $$R_nSiO_{\frac{4-n}{2}}$$

where R is selected from the group consisting of monovalent hydrocarbon radicals and halogenated monovalent hydrocarbon radicals having from 1 to 18 carbon atoms and n is a number of from 1.7 to 2.2, an organic peroxide vulcanizing agent and from 30 to 95 percent by weight of filler based on the weight of the composition, of which from about 30 to 100 percent by weight of the filler is silicon nitride particles and thereafter heating the resultant composition to a temperature sufficient to form an elastomer.

7. The method of claim 6, wherein the composition is heated to a temperature of at least 100° C.

8. The silicone elastomer prepared in accordance with the method of claim 6.

9. The elastomer of claim 6, wherein the organopolysiloxane is a copolymer of a dimethylsiloxane and a methylvinylsiloxane.

* * * * *